3,222,431
PRINTABLE POLYETHYLENE CONTAINING OXIDIZED, THERMALLY DEGRADED POLYETHYLENE
George R. Greear and John W. Tamblyn, Kingsport, Tenn., assignors to Eastman Kodak Company, Rochester, N.Y., a corporation of New Jersey
No Drawing. Filed July 18, 1956, Ser. No. 598,525
5 Claims. (Cl. 260—897)

This invention relates to polyethylene compositions, and more particularly to polyethylene compositions which when shaped into articles will retain printing inks. This invention also includes the method of making such novel polyethylene compositions and to articles formed therefrom.

As is well known, untreated polyethylene surfaces are characterized by poor retention of printing inks. Thus, while polyethylene bags and similar containers are excellent as packaging materials for various merchandise, including foodstuffs, their use for these purposes is retarded somewhat because legends, trademarks, prices, etc., when printed thereon are easily rubbed off in the course of normal handling.

Heretofore, various treatments have been devised to improve the receptivity of and retention by polyethylene of printing inks. These methods include surface oxidation treatments of the shaped polyethylene articles prior to printing. The oxidation treatments more specifically may be chemical oxidation with agents such as nitric or chromic acid, or brief exposures to blasts of hot air or actual flames. Still other treatments, involving electron bombardment or irradiation by ultraviolet in the presence of oxidizing chemicals, have been employed. Methods requiring the addition of modifiers to the printing inks, followed by heat treatments after printing on the polyethylene surface have also been disclosed as means for overcoming this undesirable characteristic of polyethylene.

All of the above-mentioned methods have the disadvantage of requiring additional processing steps preceding or during printing. These additional processing steps, of course, add to the cost of the article being printed.

An object, therefore, of the present invention is to provide a method of forming polyethylene compositions which have the property of being receptive to printing inks and to which commercial printing inks will be firmly adherent.

Another object of the present invention is to provide polyethylene compositions which may be shaped into various articles and to which commercial printing inks will be firmly adherent.

In accordance with the present invention, these and other objects are attained by suitably incorporating into resin grade polyethylene a minor proportion of a thermally degraded and oxidized polyethylene. This modified polyethylene wax imparts the desired ink receptive characteristic to the polyethylene composition and when extruded, cast or molded into articles of commerce, such articles will also have this desirable characteristic of ink receptivity and retention without loss of transparency. Thus, the extra treatments described above in connection with former methods of imparting such characteristics to polyethylene are eliminated.

We have found that from 1 to 20 parts by weight of modified polyethylene wax mixed into polyethylene will improve ink retention and receptivity. For use with most commercial printing inks, the homogeneous incorporation of 5 to 10 parts by weight of such polyethylene wax is quite satisfactory.

A polyethylene composition characterized by having such a built-in surface which is receptive to printing inks was prepared as follows: A standard molding grade of polyethylene was roll-compounded with 10 parts by weight of a modified polyethylene wax. This composition was then pressed into sheets for the printing tests. A method for making such modified wax is described hereinafter.

The printing ink selected for these tests was an aniline white ink. It was applied to the polyethylene sheets containing the polyethylene wax by means of a rubber stamp and allowed to dry for an hour. The adherence of the ink to the polyethylene was then tested by pressing a strip of Scotch tape firmly upon the inked surface and peeling it off again. If the ink remained on the polyethylene composition sheet, the adherence was considered satisfactory. If it was removed by the Scotch tape, the printing was considered unsatisfactory.

The following examples further illustrate this invention.

*Example 1*

Several sheets of polyethylene but not containing the modified wax were printed as described above and they showed complete removal of the ink by the Scotch tape adherence test irrespective of the length of the drying time.

*Example 2*

A flat surface of the modified polyethylene wax was similarly printed and dried. It was found that the printing was also removed by the Scotch tape. Investigation showed that the failure was not due to poor adhesion between the ink and wax but to lack of sufficient cohesion of the wax itself. Thus, Examples 1 and 2 clearly show that the improvement in accordance with the present invention depends on incorporating the modified wax with the resin grade polyethylene.

*Example 3*

A homogeneous sheet of polyethylene composition containing 99 parts by weight of polyethylene and 1 part by weight of modified polyethylene wax showed improved ink retention when printed, dried and tested by the Scotch tape test.

*Example 4*

A homogeneous sheet of polyethylene composition containing in parts by weight 90% polyethylene and 10% modified polyethylene wax, was tested after printing and drying for an hour by the Scotch tape test and showed substantially complete retention of the ink by the composition sheet.

*Example 5*

A homogeneous sheet comprising 80% of polyethylene and 20% modified polyethylene wax was printed and dried for an hour. The Scotch tape test showed substantially complete retention of the ink by this composite sheet.

*Example 6*

A comparison of the ink adherence of the polyethylene composition of the present invention with that of a polyethylene sheet, the surface of which has been flame treated to make it printable, showed that the composition of the present invention closely approached the adherence of the flame treated surface.

Examples 3 to 5 were repeated employing separately various resin grade polyethylenes available on the market. All showed improved printability after the modified polyethylene wax was added in the specified amounts.

The modified polyethylene wax which may be employed as the polyethylene wax component of the ink receptive polyethylene composition of the present invention may be prepared by the method described and claimed in the copending U.S. patent application Serial No. 486,974, filed February 8, 1955, by Hugh J. Hagemeyer, Jr., et al. for "Emulsifiable Waxes From Polyethylene," now U.S. Patent 3,160,621 issued December 8, 1964.

As there described, such emulsifiable polyethylene waxes having a molecular weight in the range of 1000 to 6000 are formed by a process which includes the thermal degradation of a resin grade polyethylene followed by the step of oxidizing the polyethylene product resulting from the thermal degradation. The final product is an emulsifiable polyethylene wax which may be employed in the instant invention to impart improved printing characteristics to polyethylene.

In resin grade polyethylene of a molecular weight of from 10,000 to 30,000, chain branching occurs about every 50 to 70 carbon atoms. The thermal degradation appears to take place at the branched chains. By carefully controlling the time, temperature and agitation of the resin grade polyethylene, a thermally degraded polyethylene of relatively narrow molecular weight range is obtained in the form of hard, white waxes which are not emulsifiable.

Thermally degraded polyethylene is distinguished from low and high molecular weight polyethylene polymers by a relatively narrow molecular weight distribution and by the presence of one double bond per molecule. The combination of a narrow molecular weight range and the presence of a double bond facilitates the oxidation of the thermally degraded to the emulsifiable wax.

To change the non-emulsifiable thermal degradation product to an emulsifiable polyethylene wax, it is heated in suitable apparatus to a molten state and subjected to air or oxygen whereupon auto-oxidation occurs. This increases the acid number and saponification number of the wax until it is completely emulsifiable.

The auto-oxidation may be initiated in the presence or absence of a catalyst such as ditertiary butyl peroxide or other organic peroxides or hydroperoxides and in the presence or absence of a stabilizing agent such as sodium or potassium carbonate. The use of a peroxide compounds to initiate the oxidation eliminates the induction period otherwise present in the process. The presence of a stabilizing agent gives a faster reaction by stabilizing the oxidation intermediates and results in a product which is slightly harder than one obtained in its absence. The acid numbers of the waxes obtained by this process vary from 5 to 35 and optimum properties are usually obtained at an acid number in the range of 8 to 25. The waxes have specific gravities ranging from 0.90 to 0.97.

Modified polyethylene wax made, for example, in accordance with the following example may be advantageously employed in the instant invention.

A jar was equipped as follows: The center neck was fitted with a stainless steel shaft terminating in a sweep type stirrer blade. A propeller type blade was attached 2–3" above the lower sweep blade. One small neck was fitted with a gas inlet tube fitted with a coarse dispersion disc which was led to a point just below the sweep blade of the stirrer; a second small neck was fitted with a thermometer which reaches to a point just above the sweep type blade and just clearing the propeller type blade; this neck also contained a vent tube. The third small neck was fitted with a second gas inlet tube which may be used to introduce nitrogen into the free space of the vessel in the event that pure oxygen is used as an oxidant, or it may serve as a second inlet tube for air in the event that purified air is the oxidant. In the latter event, it of course is fitted with a dispersion disc and also led to a point below the sweep blade of the stirrer.

A sample (1000 g.) of melted, thermally degraded polyethylene (molecular weight 3200) was introduced into the vessel and the stirrer was started. Di-tert-butyl-peroxide (5.0 g.) and anhydrous sodium carbonate (10.0 g.) were added to the system and purified air was passed through the dispersion discs at the rate of 3000 ml./min. The temperature of the system was held at 130 plus or minus 2° C. by means of an external heating jacket. After one hour, a second portion (5.0 g.) of di-tert-butylperoxide was added, and the reaction was allowed to continue for an additional 9–11 hours or until an acid number of 8–12 was reached. At the completion of the reaction the molten wax was poured into a suitable mold to harden. However, if small particles are desired the molten wax may be poured in a slow fine stream into rapidly agitated methanol, filtered off, and dried. The wax thus produced formed a 100% self-polishing clear emulsion.

| Properties | Starting material | Product |
| --- | --- | --- |
| Molecular weight | 3,200 | 3,500 |
| Softening point, °C | 101 | 103 |
| Hardness | *0–4 | 0–3 |
| Acid number | 0.0 | 9.0 |
| Density | 0.919 | 0.920 |
| Emulsifiability, percent | None | 100 |

*First number is on 100 g. penetration scale, second on 200 g. scale.

In general modified polyethylene waxes having acid numbers from 4 to 35 and melt viscosities at 125° C. from 1500 to 3000 centipoises are effective in improving the printability of resin grade polyethylenes.

We claim:

1. A new composition of matter consisting of solid polyethylene having a molecular weight within the range of 10,000 to 30,000 and 1 to 20 parts by weight of the composition of a thermally degraded and oxidized polyethylene having a molecular weight within the range of 1000 to 6000 and an acid number within the range of 5 to 35.

2. A new composition of matter consisting of solid polyethylene having a molecular weight within the range of 10,000 to 30,000 and 5 to 10 parts by weight of the composition of a thermally degraded and oxidized polyethylene having a molecular weight within the range of 1000 to 6000 and an acid number within the range of 5 to 35.

3. A new composition of matter consisting of solid polyethylene having a molecular weight within the range of 10,000 to 30,000 and 5 to 10 parts by weight of the composition of a thermally degraded and oxidized polyethylene having a molecular weight within the range of 1000 to 6000 and an acid number within the range of 8 to 25.

4. A new composition of matter consisting of solid polyethylene having a molecular weight within the range of 10,000 to 30,000 and 5 to 10 parts by weight of the composition of a thermally degraded and oxidized polyethylene having a molecular weight within the range of 1000 to 6000 and an acid number within the range of 5 to 35, and a melt viscosity at 125° C. within the range of 1500 to 3000 centipoises.

5. A shaped article consisting of a homogeneous mixture of solid polyethylene having a molecular weight within the range of 10,000 to 30,000 and 1 to 20 parts by weight of the composition of a thermally degraded and oxidized polyethylene having a molecular weight within the range of 1000 to 6000 and an acid number in the range of 5 to 35 and a melt viscosity at 125° C. within the range of 1500 to 3000 centipoises.

(References on following page)

References Cited by the Examiner

UNITED STATES PATENTS

| | | | |
|---|---|---|---|
| 2,512,459 | 6/1950 | Hamilton | 260—45.5 |
| 2,612,480 | 9/1952 | May | 260—28.5 XR |
| 2,698,309 | 12/1954 | Thwaites et al. | 260—28.5 |
| 2,727,024 | 12/1955 | Field et al. | 260—45.5 |
| 3,061,882 | 11/1962 | Wolinski | 260—28.5 |

FOREIGN PATENTS

| | | |
|---|---|---|
| 201,195 | 3/1955 | Australia. |
| 581,279 | 10/1946 | Great Britain. |

OTHER REFERENCES

Midwinter, British Plastics, May 1945, vol. 17, No. 192, pp. 208–215 and 228.

Irving, "Treatment of Polyethylene To Improve Ink Receptivity," Paper, Film and Foil Converter, vol. 29, No. 6 (1955), p. 28 relied on.

SAMUEL H. BLECH, *Primary Examiner.*

DANIEL ARNOLD, LESLIE H. GASTON, LEON J. BERCOVITZ, MURRAY TILLMAN, *Examiners.*